US012361243B1

(12) United States Patent
Suva et al.

(10) Patent No.: US 12,361,243 B1
(45) Date of Patent: Jul. 15, 2025

(54) BATTERY LATCH ASSEMBLY WITH A PLURALITY OF LATCH POINTS FOR ROBUST IMPACT PROTECTION IN BARCODE-READING DEVICES

(71) Applicant: Brady Worldwide, Inc., Milwaukee, WI (US)

(72) Inventors: Alan Suva, Menomonee Falls, WI (US); Gene Gladkov, Muskego, WI (US); Laura M. Wusstig, Kuna, ID (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 0 days.

(21) Appl. No.: 18/596,402

(22) Filed: Mar. 5, 2024

(51) Int. Cl.
*G06K 7/10* (2006.01)
(52) U.S. Cl.
CPC .................. *G06K 7/10881* (2013.01)
(58) Field of Classification Search
CPC .................................................. G06K 7/10881
See application file for complete search history.

(56) References Cited

U.S. PATENT DOCUMENTS

| | | | | |
|---|---|---|---|---|
| 5,401,591 | A | * | 3/1995 | Bishay ................ H01M 50/213 429/97 |
| 5,412,198 | A | * | 5/1995 | Dvorkis ............... G06K 7/1098 359/224.1 |
| 6,730,432 | B1 | | 5/2004 | Grosfeld et al. |
| 7,748,632 | B2 | | 7/2010 | Coleman et al. |
| 8,462,498 | B2 | | 6/2013 | Burmeister et al. |
| 10,312,483 | B2 | | 6/2019 | Chaney |
| 11,062,105 | B2 | | 7/2021 | Voli |

* cited by examiner

*Primary Examiner* — Jamara A Franklin
(74) *Attorney, Agent, or Firm* — Thomas M. Hardman

(57) ABSTRACT

A battery latch assembly is configured to secure a battery compartment in a device. The battery latch assembly includes a first arm that is configured to be coupled to the device. The battery latch assembly also includes a second arm coupled to the first arm so as to facilitate movement of the second arm relative to the first arm. The battery latch assembly also includes a first fastening element that is configured to releasably engage with a first cooperating member to form a first latch point that secures the first arm in a position where a portion of the first arm is aligned with and covers the battery compartment. The battery latch assembly also includes a second fastening element that is configured to releasably engage with a second cooperating member to establish a second latch point that secures the second arm to the first arm.

20 Claims, 5 Drawing Sheets

BATTERY LATCH ASSEMBLY WITH A PLURALITY OF LATCH POINTS FOR ROBUST IMPACT PROTECTION IN BARCODE-READING DEVICES

CROSS-REFERENCE TO RELATED APPLICATIONS

N/A

BACKGROUND

Barcode-reading devices, also known as barcode readers or barcode scanners, are used in various sectors including retail, logistics, and healthcare. These devices read and interpret barcodes, which are graphical representations of data typically found on products, documents, and equipment. Barcode-reading devices vary in design, ranging from handheld units to stationary devices, and play an important role in various processes such as inventory management, checkout procedures, and asset tracking.

Many barcode-reading devices rely on removable batteries as a power source. A removable battery is typically housed in a compartment that is accessible via a door or cover. A battery latch mechanism can be employed to ensure that this compartment remains securely closed. Having a secure battery compartment can be important not only for maintaining a continuous power supply and ensuring proper contact between the battery and the device's power interfaces but also for safeguarding the battery and internal components from external contaminants like dust and moisture.

One significant challenge with existing battery latch mechanisms in barcode-reading devices is their vulnerability to external forces. Barcode-reading devices are frequently used in environments where rough handling is common. Accidental drops or impacts against hard surfaces can exert significant force on the battery compartment, leading to the potential failure of the latch mechanism. When such failure occurs, the battery may become dislodged, causing abrupt power losses. These interruptions can be detrimental, leading to operational inefficiencies, loss of critical data, and errors in essential processes like inventory management and transaction recording.

Existing solutions aimed at enhancing the resilience of battery compartments often fail to provide a robust and reliable response to these challenges. Currently known mechanisms may offer some degree of protection against ingress and impact, but they typically involve complex or cumbersome methods of securing the latch. For instance, some designs require a significant force to close the latch due to resistance from certain components. This not only makes it difficult for users to securely close the compartment but also can lead to wear and tear on the relevant components, compromising the long-term integrity of the latch mechanism.

Other designs involve multi-step processes, such as requiring the user to close a latch and then rotate a cap or similar component to lock or unlock the battery compartment. These mechanisms, while providing some level of ingress and drop protection, can be cumbersome and difficult to use, particularly in high-paced work environments where speed and ease of use are important.

These limitations highlight the need for an innovative battery latch mechanism that addresses these shortcomings by providing robust protection against external forces and environmental contaminants while being user-friendly and easy to operate, even under the demanding conditions often encountered in sectors where barcode-reading devices (and other similar electronic devices) are heavily utilized.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

In accordance with one embodiment of the present disclosure, a battery latch assembly is disclosed. The battery latch assembly is configured for use in a device with a battery compartment designed to hold a removable battery, and the battery latch assembly is configured to secure the battery compartment. The battery latch assembly includes a first arm that is configured to be coupled to the device. The first arm includes a battery compartment-enclosing portion. The battery latch assembly also includes a second arm that is configured to be coupled to the first arm so as to facilitate movement of the second arm relative to the first arm. The battery latch assembly also includes a first fastening element that is configured to releasably engage with a first cooperating member to form a first latch point that secures the first arm in a position where the battery compartment-enclosing portion is aligned with and covers the battery compartment. The battery latch assembly also includes a second fastening element that is configured to releasably engage with a second cooperating member to establish a second latch point that secures the second arm to the first arm. The second latch point works in conjunction with the first latch point to provide dual locking for the battery latch assembly.

In some embodiments, the battery latch assembly also includes a sealing member that is configured to establish an ingress protection (IP) seal over the battery compartment. The sealing member can be configured to encompass the battery compartment-enclosing portion of the first arm. Engagement of the first cooperating member by the first fastening element can exert a compressive force on the sealing member to establish the IP seal over the battery compartment.

In some embodiments, the first fastening element can be coupled to the first arm and to the second arm, and the first cooperating member can be coupled to the device. The second fastening element can be coupled to the second arm, and the second cooperating member can be coupled to the first arm.

In some embodiments, the first arm can be pivotally coupled to the device so as to facilitate first rotational movement of the first arm relative to the battery compartment. In addition, the second arm can be pivotally coupled to the first arm so as to facilitate second rotational movement of the second arm relative to the first arm. The first rotation movement can occur in a first direction, and the second rotational movement can occur in a second direction that is different from the first direction.

In some embodiments, the second arm includes a camming surface. The camming surface can be positioned so that, upon rotation of the second arm away from the battery compartment, the camming surface engages a leverage surface of the device to provide mechanical leverage to facilitate disengagement of an ingress protection (IP) seal from the battery compartment.

In some embodiments, the battery latch assembly includes a release actuator within the second arm. The release actuator can be configured so that engagement of the release actuator causes the second fastening element to become disengaged from the second cooperating member.

In some embodiments, the rotation of the second arm away from the first arm can initiate disengagement of the first fastening element from the first cooperating member. In addition, the rotation of the second arm away from the first arm can additionally initiate disengagement of the IP seal from the battery compartment.

In some embodiments, the battery latch assembly can additionally include a torque-imparting member that is configured to exert a rotational force on the first arm to maintain the battery compartment-enclosing portion of the first arm away from the battery compartment when the IP seal has been disengaged.

In some embodiments, the battery latch assembly can additionally include a biasing member that is configured to bias the second fastening element into a position where the second fastening element releasably engages the second cooperating member to maintain the second latch point. The biasing member can also be positioned to provide a resistive force for the release actuator.

In some embodiments, activation of the release actuator can cause the biasing member to deform, and deformation of the biasing member can cause the second fastening element to disengage from the second cooperating member within the first arm.

In some embodiments, the first cooperating member can include a pin that is mounted to the device, and the first fastening element can include a hook that releasably engages the pin.

In some embodiments, the second cooperating member can include a ledge in a recess formed within the first arm, and the second fastening element can include a tab that extends from the second arm and releasably engages the ledge.

In some embodiments, the battery latch assembly additionally includes an upward force-exerting member that is located underneath the battery within the battery compartment. The upward force-exerting member can be positioned to exert an upward force against the battery.

In accordance with another embodiment of the present disclosure, a barcode-reading device is disclosed. The barcode-reading device includes a housing defining a battery compartment designed to hold a removable battery. The barcode-reading device also includes a battery latch assembly that is configured to secure the battery compartment. The battery latch assembly includes a first arm that is coupled to the housing. The first arm includes a battery compartment-enclosing portion. The battery latch assembly also includes a second arm that is coupled to the first arm so as to facilitate movement of the second arm relative to the first arm. The battery latch assembly also includes a first fastening element that is configured to releasably engage with a first cooperating member to form a first latch point that secures the first arm in a position where the battery compartment-enclosing portion is aligned with and covers the battery compartment. The battery latch assembly also includes a second fastening element that is configured to releasably engage with a second cooperating member to establish a second latch point that secures the second arm to the first arm. The second latch point works in conjunction with the first latch point to provide dual locking for the battery latch assembly.

In some embodiments, the battery latch assembly can additionally include a sealing member that is configured to encompass the battery compartment-enclosing portion of the first arm. Engagement of the first cooperating member by the first fastening element can exert a compressive force on the sealing member to establish an ingress protection (IP) seal over the battery compartment.

In some embodiments, the first arm can be pivotally coupled to the barcode-reading device so as to facilitate rotational movement of the first arm relative to the battery compartment. The second arm can be pivotally coupled to the first arm so as to facilitate second rotational movement of the second arm relative to the first arm. The first rotational movement can occur in a first direction, and the second rotational movement can occur in a second direction that is different from the first direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to a battery latch assembly for a barcode-reading device. The battery latch assembly is designed to secure a battery compartment where a removable battery is stored. Embodiments of the battery latch assembly disclosed herein can address the challenges faced by existing latch mechanisms in barcode-reading devices, which are often prone to failure under the stress of external impacts, such as drops or collisions. Embodiments of the battery latch assembly disclosed herein utilize a plurality of latch points. This innovative design ensures a robust and reliable locking mechanism for the battery compartment, significantly reducing the likelihood of accidental opening during rough handling or impact. While providing robust security, the latch points can also be disengaged when necessary, without requiring excessive force or complex maneuvers.

Figure 1:
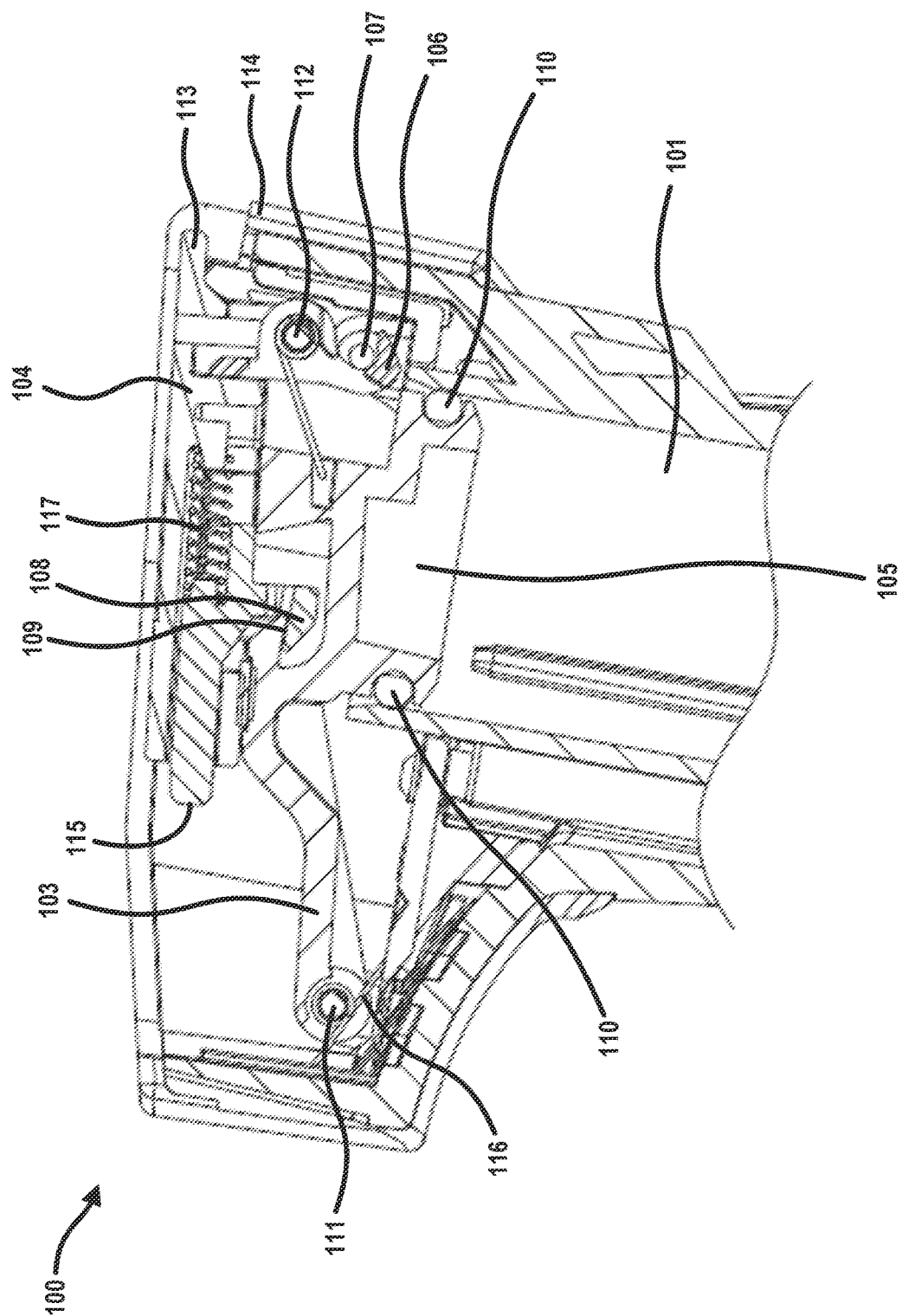
FIG. 1 is a side cross-sectional view of a battery latch assembly in accordance with an embodiment of the present disclosure, the battery latch assembly including two separate latch points, both of which are in a closed position.
Figure 2:
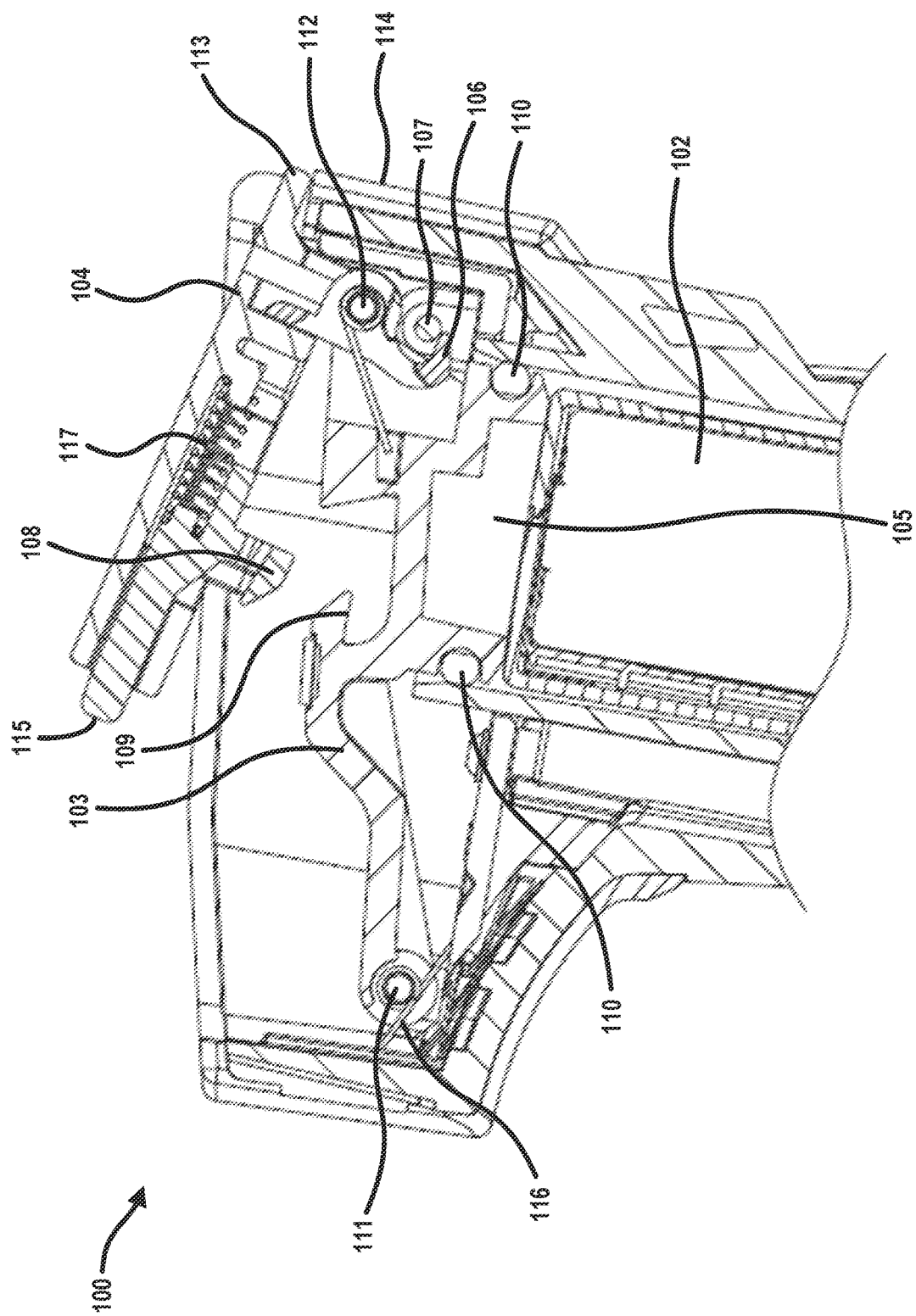
FIG. 2 is another side cross-sectional view of the battery latch assembly shown in FIG. 1, the second latch point having been released and the second arm having been rotated away from the first arm.
Figure 3:
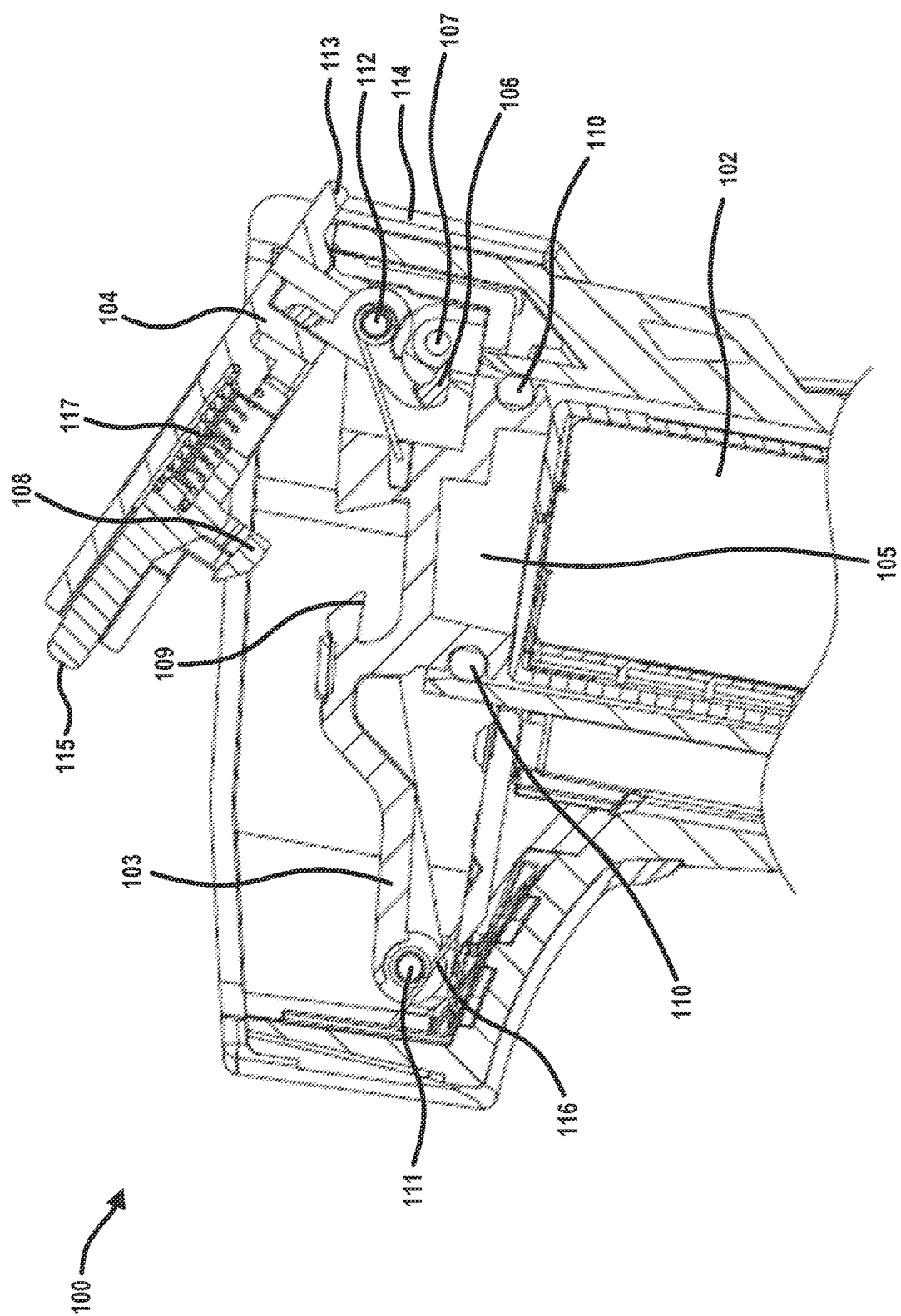
FIG. 3 is another side cross-sectional view of the barcode-reading device with the battery latch assembly, illustrating the state of the battery latch assembly after both the first latch point and the second latch point have been released.
Figure 4:
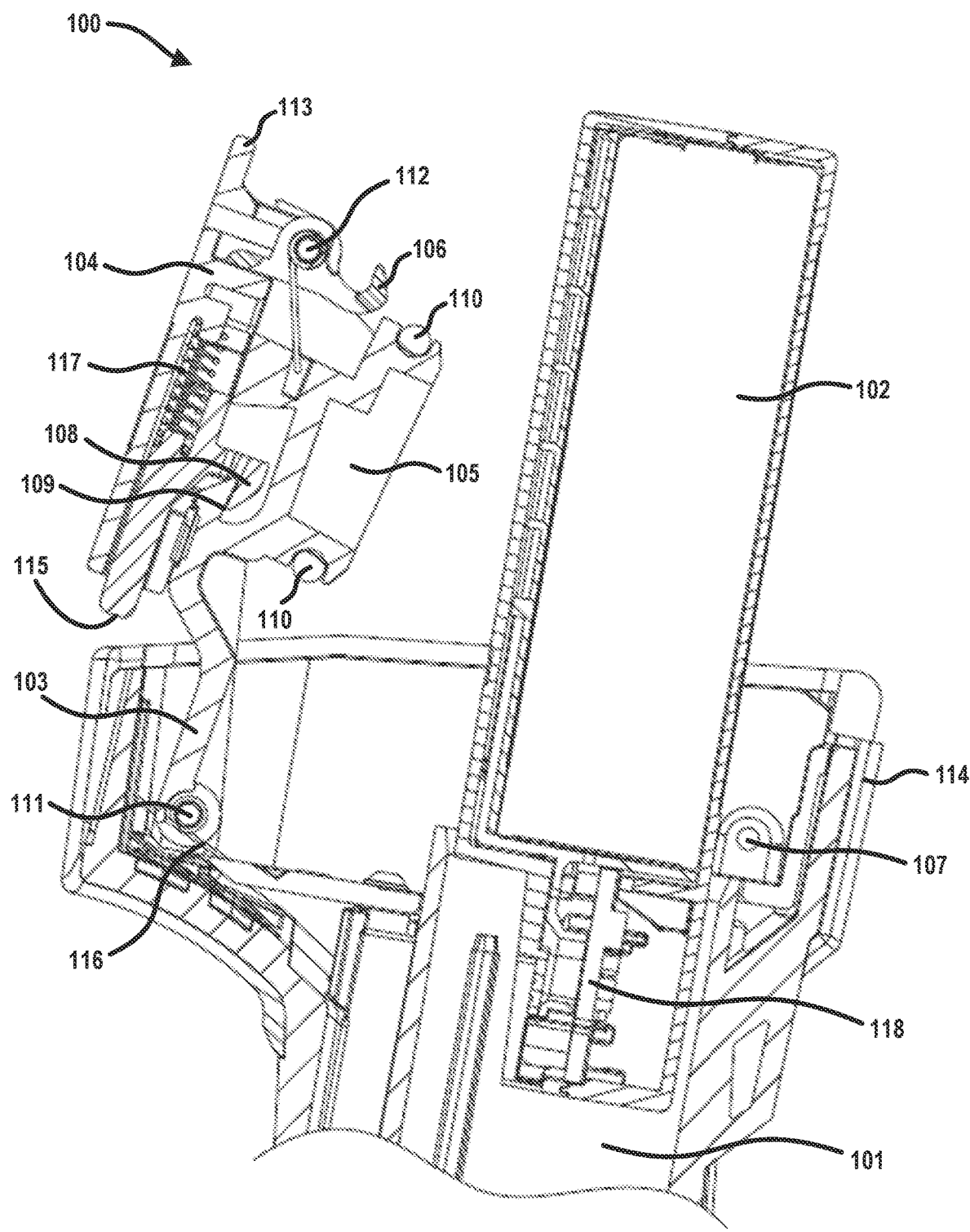
FIG. 4 is another side cross-sectional view of the barcode-reading device with the battery latch assembly, illustrating the battery latch assembly in a state where the battery within the battery compartment is accessible.

FIG. 1 is a side cross-sectional view of a barcode-reading device that includes a battery latch assembly 100 in accordance with an embodiment of the present disclosure. The barcode-reading device includes a battery compartment 101 that is configured to house and accommodate a battery 102 (which is shown in FIGS. 2-4).

The battery compartment 101 is designed to conform to the shape and size of the battery 102, providing a relatively tight fit that aids in the stabilization of the battery 102 while the barcode-reading device is in use. The battery 102 and the battery compartment 101 are designed so that the battery 102 can be easily inserted into and removed from the battery compartment 101. The removable nature of the battery 102 allows for quick replacement or swapping, facilitating uninterrupted use of the barcode-reading device.

When the barcode-reading device is in operation, it is important for the battery 102 to remain firmly in place to ensure a consistent power supply. The battery latch assembly 100 is configured to perform this function by securing the battery compartment 101. In other words, the battery latch assembly 100 functions to ensure the retention of the battery 102 within the battery compartment 101, particularly under conditions of movement or impact. Advantageously, the battery latch assembly 100 includes a dual-locking mechanism that incorporates two separate latch points. The use of two separate latch points significantly reduces the likelihood that the battery 102 will become dislodged from the battery compartment 101 when the barcode-reading device is in use. This helps the barcode-reading device to maintain a stable power supply and prevent operational disruptions.

The battery latch assembly 100 includes two distinct elongated components, hereafter designated as the first arm 103 and the second arm 104. The term "arm" in this context is used to describe a linear, extended structural element that is configured for mechanical action. The first arm 103 is coupled to an internal wall of the barcode-reading device, thereby ensuring a stable anchor point within the structure of the barcode-reading device. The second arm 104 is coupled to the first arm 103. As will be described in greater detail below, the coupling between the first arm 103 and the second arm 104 allows for controlled relative movement between the two arms 103, 104.

As mentioned previously, the battery latch assembly 100 incorporates two separate latch points. The first latch point facilitates the secure positioning of the first arm 103. More specifically, the first latch point holds a particular section of the first arm 103, referred to as the battery compartment-enclosing portion 105, in alignment with the battery compartment 101. This alignment enables the battery compartment-enclosing portion 105 to effectively cover and protect the battery compartment 101. The second latch point secures the second arm 104 to the first arm 103, thereby adding an additional layer of stability to the battery latch assembly 100. The first latch point and the second latch point work together to provide dual locking for the battery latch assembly 100. This dual locking not only ensures the secure closure of the battery compartment 101 but also significantly enhances the overall resilience of the battery latch assembly 100, particularly against forces that might arise from impacts, such as when the barcode-reading device is accidentally dropped.

The first latch point of the battery latch assembly 100 is established by an interaction between a first fastening element and a first cooperating member. In the illustrated embodiment, the first fastening element takes the form of a hook 106, and the first cooperating member takes the form of a pin 107. The hook 106 is coupled to both the first arm 103 and the second arm 104, and the pin 107 is coupled to the internal wall of the device housing. More specifically, the hook 106 is configured to releasably engage the pin 107 to secure the first arm 103 in a position where the battery compartment-enclosing portion 105 is aligned with and covers the battery compartment 101. In this context, the term "releasably engage" means that the hook 106 is structured to securely connect with the pin 107 in a way that permits intentional disengagement when appropriate. By releasably engaging with the pin 107, the hook 106 provides a secure yet detachable connection, allowing for access to the battery compartment 101 when needed, while ensuring that the battery compartment 101 remains securely closed during normal operation.

The second latch point of the battery latch assembly 100 is established through the interaction of a second fastening element with a second cooperating member. In the illustrated embodiment, the second fastening element is embodied as a tab 108, and the second cooperating member is embodied as a ledge 109. The tab 108 is coupled to the second arm 104, and the ledge 109 is located within a recess in the first arm 103. The ledge 109 is shown most clearly in FIGS. 2 and 3. The recess is positioned and shaped to accommodate the tab 108, and the tab 108 is configured to allow it to releasably engage with the ledge 109. The term "releasably engage" in this context is used in the same manner as described above. Thus, the tab 108 is structured to securely connect with the ledge 109 in a way that permits intentional disengagement when appropriate.

Both the engagement of the pin 107 by the hook 106 and the engagement of the ledge 109 by the tab 108 are designed to be strong enough to withstand forces such as those encountered during impacts, thereby preventing accidental opening of the battery compartment 101. A notable benefit of this two-latch design is its redundancy in securing the battery compartment 101. Even if one latch point becomes disengaged due to an impact, it is highly unlikely that both latch points would fail simultaneously. This means that even if one latch point fails, the other latch point is likely to remain engaged, thereby maintaining the battery 102 securely in place within the battery compartment 101. Additionally, both these connections (the hook 106 with the pin 107 and the tab 108 with the ledge 109) are designed so that they can be intentionally disengaged by the user when access to the battery compartment 101 is needed.

The battery latch assembly 100 also includes a sealing member. In the depicted embodiment, an O-ring 110 is utilized as the sealing member. The O-ring 110 encircles the battery compartment-enclosing portion 105 of the first arm 103. The O-ring 110 is made from a compressible material. There are a variety of compressible materials that could be used, depending on the required durability, flexibility, and resistance to various environmental factors. Some examples of such materials include, but are not limited to, nitrile rubber, silicone, and fluorocarbon.

Upon the engagement of the hook 106 with the pin 107, establishing the first latch point, a compressive force is exerted on the O-ring 110. This force causes the O-ring 110 to deform, enabling it to adaptively conform to the contours of the battery compartment-enclosing portion 105 of the first arm 103. This adaptive deformation of the O-ring 110 forms an ingress protection (IP) seal. In general, the term "IP seal" refers to a barrier specifically designed to prevent the infiltration of external contaminants, such as dust, moisture, and other environmental particulates, into sensitive areas of a device. In this case, the IP seal created by the O-ring 110 effectively seals the battery compartment 101, thereby preventing the ingress of such contaminants and ensuring the secure and uninterrupted operation of the battery 102 within the barcode-reading device. Therefore, the inclusion of the O-ring 110 enhances the protective capabilities of the battery latch assembly 100 against environmental factors.

In alternative embodiments, various other types of sealing members, including different forms of gaskets, can be employed to achieve the ingress protection function of the battery latch assembly 100. For instance, a flat gasket or a custom-shaped gasket made of compressible material could be used as an alternative to the O-ring 110. Similarly to the O-ring 110, this type of gasket could be positioned to provide a seal around the battery compartment-enclosing portion 105 of the first arm 103, compressing upon the engagement of the latch points to form an effective barrier. As another example, a lip seal could be utilized. A lip seal employs a flexible lip pressing against a mating surface to create a seal. Each of these alternatives provides a means to safeguard the battery compartment 101 from external contaminants. Those skilled in the art will recognize other types of sealing members that could be utilized.

As noted above, the first arm 103 is coupled to an internal wall of the housing. More specifically, the first arm 103 is pivotally coupled to the internal wall of the device housing through a first pivot joint 111. This pivotal coupling allows the first arm 103 to undergo rotational movement with respect to the battery compartment 101. This rotation is directed in a counterclockwise manner when observed from the perspective shown in FIG. 1.

The second arm 104 is pivotally coupled to the first arm 103, establishing a compound movement system within the battery latch assembly 100. This pivotal coupling is facilitated by a second pivot joint 112, which provides the second arm 104 with its own distinct range of motion, independent yet coordinated with the movement of the first arm 103. The movement of the second arm 104 is characterized by a clockwise rotation when observed from the perspective shown in FIG. 1, which complements the counterclockwise motion of the first arm 103. This dual-arm configuration with specified directional rotations helps maintain the integrity of the battery compartment 101, especially in scenarios where the barcode-reading device may be subjected to impact or similar forces.

The second arm 104 of the battery latch assembly 100 includes a camming surface 113. In general, the term "camming surface" refers to a part of a component that is designed to convert rotational motion into linear motion, or to exert a controlled force, through direct interaction with another component. This interaction typically involves the camming surface pushing or pulling against the other component as it moves, thereby translating the motion or force in a manner that achieves a desired mechanical outcome, such as facilitating movement, exerting pressure, or enabling disengagement of connected parts.

In the depicted embodiment, the camming surface 113 is positioned to come into contact with a portion of the device housing as the second arm 104 rotates in a direction moving away from the battery compartment 101. The portion of the device housing that the camming surface 113 comes in contact with may be referred to herein as the leverage surface 114. The interaction between the camming surface 113 and the device surface 114 effectively translates the rotational movement of the second arm 104 into a mechanical advantage. This mechanical advantage is leveraged to facilitate the disengagement of the IP seal, which (as noted above) is tightly fitted against the battery compartment 101 to prevent the entry of environmental contaminants. By exerting this leverage, the camming surface 113 considerably diminishes the force required by the user to overcome the resistance of the IP seal during the unlatching process. As a result, the process of opening the battery compartment 101 becomes less difficult, thereby enhancing the user experience, particularly in scenarios where the device is frequently accessed or operated under time-sensitive conditions.

The second arm 104 also includes a release actuator. In the depicted embodiment, the release actuator is a button 115. The configuration of this button 115 is such that, upon engagement by the user, it initiates a controlled sequence of mechanical actions. The first of these is the disconnection of the tab 108 from the ledge 109, thereby releasing the second latch point and enabling the rotation of the second arm 104 in a direction moving away from the first arm 103. The rotation of the second arm 104 enables the release of the hook 106 from the pin 107, which helps secure the first arm 103 over the battery compartment 101. Releasing the hook 106 from the pin 107 subsequently facilitates the disengagement of the IP seal. As noted above, the camming surface 113 on the second arm 104 helps facilitate this process, as its interaction with the leverage surface 114 translates the rotational motion of the second arm 104 into a force that effectively eases the disengagement of the tightly engaged IP seal. This series of actions concludes with the rotation of the first arm 103 away from the battery compartment 101, ultimately allowing access to the battery 102. This series of mechanical responses, initiated by the actuation of the button 115, enables a straightforward and efficient method for opening the battery compartment 101.

The battery latch assembly 100 also includes a torque-imparting member, which in the depicted embodiment takes the form of a torsion spring 116. In general, the term "torsion spring" refers to a mechanical component that is designed to store and release energy by means of twisting or rotational motion. In the depicted embodiment, the torsion spring 116 is configured to exert a rotational force on the first arm 103. More specifically, the torsion spring 116 is positioned and calibrated to exert consistent, controlled torque on the first arm 103. The torsion spring 116 ensures that, when the IP seal is disengaged, the battery compartment-enclosing portion 105 of the first arm 103 is actively and reliably held at a distance from the battery compartment 101. This action prevents the inadvertent closure of the battery compartment-enclosing portion 105 during the process of replacing (or inspecting) the battery 102, thereby enhancing user safety and convenience. The force exerted by the torsion spring 116 ensures that the first arm 103 remains in a stable, open position until the user intentionally moves it to close the battery compartment 101, thereby engaging the IP seal once again. This feature of the battery latch assembly 100 contributes to the smooth operation and functional reliability of the barcode-reading device, especially in scenarios requiring frequent access to the battery compartment 101.

The second arm 104 includes a biasing member, which in the depicted embodiment takes the form of a compression spring 117. The compression spring 117 serves at least two different functions within the battery latch assembly 100, contributing to both stability and ease of user interaction.

When the battery latch assembly 100 is in the closed position, the compression spring 117 is in its uncompressed state. In its uncompressed state, the compression spring 117 exerts a consistent, directed force on the tab 108, biasing the tab 108 towards a secure engagement with the ledge 109 within the first arm 103. This constant force ensures the engagement of the tab 108 with the ledge 109, actively maintaining the integrity of the second latch point. This configuration is important for securing the tab 108 in a locked position with the ledge 109, thereby ensuring the stability of the battery compartment 101 against unintended opening.

Additionally, the compression spring 117 provides a resistive force, which is encountered by the user when activating the button 115 to initiate the disengagement process of the tab 108 from the ledge 109 to access the battery compartment 101. When the user activates or engages the button 115, the compression spring 117 compresses. This compression changes the force dynamics on the tab 108, allowing it to disengage from the ledge 109. This disengagement is the first step in releasing the second latch point, which facilitates the subsequent rotational movement of the second arm 104. Once disengaged, the second arm 104 is free to rotate away from the first arm 103.

FIG. 2 is another side cross-sectional view of the barcode-reading device with the battery latch assembly 100, illustrating the state of the battery latch assembly 100 after the second latch point has been released. In FIG. 2, the button 115 has been engaged by the user. This engagement triggers a sequence of mechanical actions within the battery latch assembly 100, leading to a change in the configuration compared to FIG. 1.

The engagement of the button 115 causes the compression spring 117, which was previously applying a force to maintain the tab 108 of the second arm 104 in secure engagement with the ledge 109 in the first arm 103, to compress. This compression alters the force dynamics on the tab 108, allowing it to disengage from the ledge 109. As a result, the second latch point is released. The disengagement of the tab 108 from the ledge 109 is illustrated in FIG. 2, showing a gap between these components, indicating that the connection at the second latch point has been intentionally disrupted.

Following the release of the second latch point, the second arm 104 is illustrated as having rotated away from the first arm 103. This rotation is facilitated by the pivotal coupling of the second arm 104 to the first arm 103 through the second pivot joint 112. FIG. 2 shows the second arm 104 at an angle indicative of its movement away from the first arm 103. The movement of the second arm 104 is in a clockwise direction when observed from the perspective shown in FIG. 2. The camming surface 113 on the second arm 104 is now positioned at a different angle due to the rotation of the second arm 104. The camming surface 113 is beginning to engage the leverage surface 114.

FIG. 3 is another side cross-sectional view of the barcode-reading device with the battery latch assembly 100, illustrating the state of the battery latch assembly 100 after both the first latch point and the second latch point have been released.

The hook 106, which previously engaged the pin 107 on the internal wall of the device housing, has been released. This release occurs as a result of the further rotation of the second arm 104 away from the first arm 103. While the hook 106 is disengaged from the pin 107, the battery compartment-enclosing portion 105 of the first arm 103 maintains its alignment with the battery compartment 101 because the IP seal formed by the O-ring 110 is still in place.

The camming surface 113 on the second arm 104, having been repositioned through the further rotation of the second arm 104, is now beginning to engage the leverage surface 114 more directly. By engaging with the leverage surface 114, the camming surface 113 enables the user to gain a mechanical advantage to ease the release of the tightly fitted IP seal.

FIG. 4 is another side cross-sectional view of the barcode-reading device with the battery latch assembly 100, illustrating the battery latch assembly 100 in a state where the battery 102 is accessible.

More specifically, the camming surface 113 on the second arm 104, through its interaction with the leverage surface 114, has provided the necessary mechanical advantage to assist in the breaking of the IP seal formed by the O-ring 110. Disengagement of the IP seal enables the first arm 103 to be rotated in a counterclockwise direction, rendering the battery compartment 101 accessible for removal of the battery 102.

FIG. 4 shows the first arm 103 having undergone a substantial rotation away from its original position over the battery compartment 101. This movement is facilitated by the pivotal coupling at the first pivot joint 111. Rotation of the first arm 103 in this manner exposes the battery compartment 101. FIG. 4 shows the first arm 103 after it has been rotated to a substantially vertical position away from the battery compartment 101. The torsion spring 116 ensures that once disengaged, the first arm 103 remains in a stable, open position, preventing inadvertent closure that might obstruct access to the battery compartment 101 during the process of replacing the battery 102.

As the first arm 103 retracts from the battery compartment 101, the second arm 104 rotates back toward the first arm 103, guiding the tab 108 back into a position where it can once again engage with the ledge 109 within the recess of the first arm 103. This causes the second arm 104 to become recoupled to the first arm 103.

In the configuration depicted in FIG. 4, the battery 102 is partially extended out of the battery compartment 101. This is due at least in part to the presence of an upward force-exerting member located underneath the battery 102 within the battery compartment 101. In the depicted embodiment, the upward force-exerting member takes the form of a compression spring 118 that exerts an upward force against the battery 102, aiding in its partial extension out of the battery compartment 101 and facilitating the removal or replacement of the battery 102.

Figure 5:
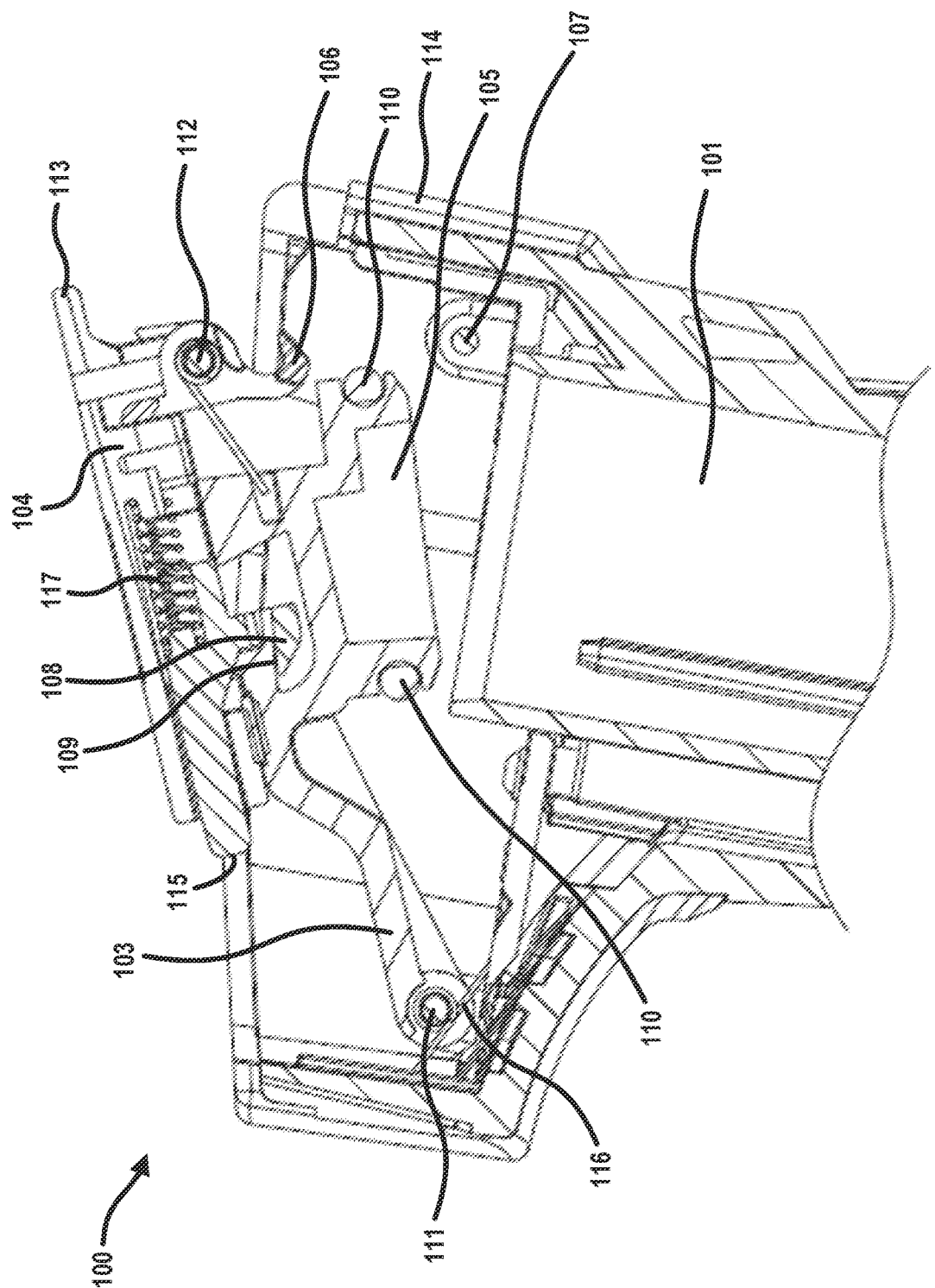
FIG. 5 is another side cross-sectional view of the barcode-reading device with the battery latch assembly, illustrating the battery latch assembly in the process of re-securing the battery compartment.

FIG. 5 is another side cross-sectional view of the barcode-reading device with the battery latch assembly 100, illustrating the battery latch assembly 100 in the process of re-securing the battery compartment 101.

The user can begin the process of re-securing the battery latch assembly 100 by applying a downward force on the first arm 103, directing it in a clockwise rotation towards the battery compartment 101. This movement is guided and controlled by the pivotal coupling at the first pivot joint 111.

FIG. 5 shows the battery latch assembly 100 in a state between the fully unlatched position shown in FIG. 4 and the fully latched position shown in FIG. 1. As the user continues to push downward on the second arm 104, the first arm 103 approaches its original position over the battery compartment 101, and the hook 106 on the first arm 103 begins to approach the pin 107 on the internal wall of the device housing. As the hook 106 engages with the pin 107, a compressive force is exerted on the O-ring 110. This has the effect of reestablishing the first latch point, including the IP seal around the battery compartment 101.

The battery 102 is a power source that provides power for the operation of the barcode-reading device. In some embodiments, the battery 102 can be capable of being recharged using an appropriate charging mechanism. The battery 102 may be of various types depending on the power requirements and operational specifications of the barcode-reading device. Examples of such battery types include, but are not limited to, lithium-ion, lithium-polymer, nickel-cadmium (NiCd), and nickel-metal hydride (NiMH).

Those skilled in the art will recognize many variations that could be made to the battery latch assembly 100 shown in FIGS. 1-5 while still remaining within the scope of the inventive concepts disclosed herein.

For example, although the battery latch assembly 100 shown in FIGS. 1-5 includes two separate latch points, alternative embodiments could incorporate additional latch points.

Moreover, in addition to the specific fastening elements and cooperating members described herein, it should be understood that various alternatives could be employed to achieve similar functions within the battery latch assembly. Some non-limiting examples of alternative fastening elements and cooperating members include: a slide-and-lock mechanism, an elastic or flexible catch (where one part has a flexible arm or catch that snaps over a corresponding part to secure it in place), a ball detent mechanism (where a ball partially embedded in one component snaps into a socket or groove on the other component), interlocking grooves and ridges, toggle clamps, a V-shaped clip that engages with a corresponding slot or recess, a disc that rotates to align or misalign pins with slots in the cooperating member, a threaded fastener that can be quickly engaged or disengaged with a quarter turn or similar minimal movement, a magnetic catch supplemented by a mechanical latch, and so forth.

As another possible alternative, the release actuator, which is a button 115 in the embodiment depicted in FIGS. 1-5, could be replaced with a rotary actuator. The rotary actuator could be designed to initiate the unlatching process through rotational motion rather than linear translation. The rotary actuator could be designed as a dial or knob that is positioned on the battery latch assembly in a manner that is ergonomically accessible and intuitive for the user. The rotary actuator could be configured so that, upon rotation of the dial, the actuator interacts with the second arm of the battery latch assembly to disengage the second latch point. This interaction could be facilitated by a cam or wedge mechanism integrated into the rotary actuator, which, upon rotation, exerts a force on the second arm.

Instead of the torsion spring 116 described previously, another structure could be utilized as a torque-imparting member. Some examples include a helical spring that operates similarly to a torsion spring but utilizes a helical coil mechanism to apply torque; a counterbalance weight that, through its gravitational pull, exerts a rotational force on a lever or arm within the battery latch assembly; and/or a magnetic torque-imparting member that utilizes magnets with opposing poles. Additionally, elastomeric materials, such as rubber bands or silicone pads, can also provide a flexible and adaptable means to exert controlled force. Those skilled in the art will be able to identify additional structures that could serve as torque-imparting members.

Instead of the compression spring 117 described previously, another structure could be utilized as a biasing member. For instance, another type of spring (e.g., a torsion spring, a leaf spring) could be utilized to exert a directed force necessary for maintaining the engagement of latch components or facilitating their disengagement when activated. Additionally, elastomeric materials can also function as biasing members by providing a flexible, resilient force to maintain or release latch points. Those skilled in the art will be able to identify additional structures that could serve as biasing members.

As another possible alternative, the compression spring 117 in the battery latch assembly 100 could be eliminated. Instead of the compression spring 117, a portion of the release actuator itself, or an integrated component thereof, could be designed to be inherently flexible. This flexibility would allow the release actuator to store mechanical energy when force is applied (similar to the function of a spring) and release it when the force is removed. For instance, the button 115 (or rotary dial) could be manufactured from a material, or incorporate a structure, that offers inherent elasticity. Upon user interaction, this inherent elasticity could provide the necessary force to engage or disengage the second latch point by flexing and then returning to its original position.

Instead of the compression spring 118 described previously, another structure could be utilized as an upward force-exerting member. For instance, another type of spring (e.g., a leaf spring) could be utilized to provide a consistent force against the battery. Another example is a rubber dome or elastomeric bump, which can compress under the weight of the battery and then expand to push the battery upwards when the latch is released. Those skilled in the art will be able to identify additional structures that could serve as an upward force-exerting member.

In another alternative embodiment, the pivotal motion associated with the first arm 103 of the battery latch assembly 100 could be replaced with a linear sliding motion. For example, the first pivot joint 111 could be transformed into a sliding joint, allowing the first arm to engage and disengage from the battery compartment through a linear movement rather than a rotational one. In one possible configuration, the first arm could be mounted on a track or guide that permits smooth linear motion towards and away from the battery compartment. Similarly, the first fastening element of the first arm could be adapted to complement the linear movement of the first arm. The first fastening element could be designed to engage with a first cooperating member, such as a catch or slot, that is positioned on the internal wall of the device housing. The first fastening element could be positioned so that, as the first arm slides linearly, the first fastening element comes into alignment with the first cooperating member and securely engages with it, thereby establishing the first latch point.

A battery latch assembly in accordance with the present disclosure provides a robust and reliable solution for securing the battery compartment of a barcode-reading device, particularly against inadvertent opening due to impacts or other forces. The battery latch assembly includes at least two distinct latch points, each contributing to the overall stability and security of the battery compartment. The first latch point ensures the battery compartment-enclosing portion of the first arm is effectively aligned and held over the battery compartment. The second latch point further reinforces the assembly by securing the second arm to the first, thus adding an additional layer of stability. The dual-latch mechanism significantly mitigates the risk of both latches disengaging simultaneously, ensuring that the battery remains securely housed even under strenuous conditions. Additionally, the incorporation of a sealing member, such as an O-ring, provides ingress protection, safeguarding the battery compartment from external contaminants. Thus, a battery latch assembly as disclosed herein offers a secure, user-friendly, and environmentally resilient solution.

The terms "comprising," "including," and "having" are intended to be inclusive and mean that there can be additional elements other than the listed elements.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the context of mechanical structures, the term "coupled" denotes the connection or linkage between two or more components, parts, or elements of a mechanical structure. This connection or linkage can either be direct or indirect. A direct coupling implies that the elements are physically joined, attached, or integrally formed as a singular unit within the structure, without the necessity for separate intermediate components. In contrast, an indirect coupling may involve other elements or mediums facilitating the linkage between parts. Various means, such as mechanical fasteners, adhesives, welding, friction fitting, or magnetic interaction, can achieve this coupling. It can either permit relative motions like rotational or translational movement or be rigid, inhibiting any relative motion between the joined components. Whether temporary or permanent, this coupling can be purposed to convey force, motion, energy, or signals among the interconnected components. The term "coupled" as defined here aims to encapsulate all such associations or linkages, regardless of the specific method or mechanism of coupling.

The term "substantially" should be interpreted to mean "to a great extent or degree." The term "substantially" denotes that something is mostly or for the most part as specified but may not be in all details or aspects. In other words, the term "substantially" means that the exact description may not be met, but the variation from the description does not materially affect the basic functionality of that element or component. This allows for tolerances, variations, and imperfections that do not materially affect performance.

The terms "substantially vertical" and "substantially horizontal" mean that something is mostly or significantly vertical or horizontal, respectively, although it may not be perfectly so. In some embodiments, an element is considered "substantially vertical" if its deviation from perfect verticality is less than or equal to 1 degree, and "substantially horizontal" if its deviation from perfect horizontality is less than or equal to 1 degree. In other embodiments, an element is "substantially vertical" if its deviation from perfect verticality is less than or equal to 5 degrees, and "substantially horizontal" if its deviation from perfect horizontality is less than or equal to 5 degrees. Furthermore, in other embodiments, an element is "substantially vertical" if its deviation from perfect verticality is less than or equal to 10 degrees, and "substantially horizontal" if its deviation from perfect horizontality is less than or equal to 10 degrees. Moreover, those skilled in the art will recognize that the amount of deviation could vary from the specific values just listed while still remaining within the scope of the present disclosure.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A battery latch assembly for use in a device with a battery compartment designed to hold a removable battery, the battery latch assembly being configured to secure the battery compartment, the battery latch assembly comprising:
    a first arm that is configured to be coupled to the device, the first arm comprising a battery compartment-enclosing portion;
    a second arm coupled to the first arm so as to facilitate movement of the second arm relative to the first arm;
    a first fastening element that is configured to releasably engage with a first cooperating member to form a first latch point that secures the first arm in a position where the battery compartment-enclosing portion is aligned with and covers the battery compartment; and
    a second fastening element that is configured to releasably engage with a second cooperating member to establish a second latch point that secures the second arm to the first arm, the second latch point working in conjunction with the first latch point to provide dual locking for the battery latch assembly.

2. The battery latch assembly of claim 1, wherein the battery latch assembly further comprises a sealing member that is configured to establish an ingress protection (IP) seal over the battery compartment.

3. The battery latch assembly of claim 2, wherein:
    the sealing member is configured to encompass the battery compartment-enclosing portion of the first arm; and
    engagement of the first cooperating member by the first fastening element exerts a compressive force on the sealing member to establish the IP seal over the battery compartment.

4. The battery latch assembly of claim 1, wherein:
    the first fastening element is coupled to the first arm and to the second arm; and
    the first cooperating member is coupled to the device.

5. The battery latch assembly of claim 4, wherein:
    the second fastening element is coupled to the second arm; and
    the second cooperating member is coupled to the first arm.

6. The battery latch assembly of claim 1, wherein:
    the first arm is pivotally coupled to the device so as to facilitate first rotational movement of the first arm relative to the battery compartment, the first rotational movement occurring in a first direction; and the second arm is pivotally coupled to the first arm so as to facilitate second rotational movement of the second arm relative to the first arm, the second rotational movement occurring in a second direction that is different from the first direction.

7. The battery latch assembly of claim 6, wherein:
the second arm comprises a camming surface; and
the camming surface is positioned so that, upon rotation of the second arm away from the battery compartment, the camming surface engages a leverage surface of the device to provide mechanical leverage to facilitate disengagement of an ingress protection (IP) seal from the battery compartment.

8. The battery latch assembly of claim 1, further comprising a release actuator within the second arm, wherein the release actuator is configured so that engagement of the release actuator causes the second fastening element to become disengaged from the second cooperating member.

9. The battery latch assembly of claim 6, wherein the rotation of the second arm away from the first arm initiates disengagement of the first fastening element from the first cooperating member.

10. The battery latch assembly of claim 9, wherein the rotation of the second arm away from the first arm additionally initiates disengagement of an ingress protection (IP) seal from the battery compartment.

11. The battery latch assembly of claim 10, further comprising a torque-imparting member that is configured to exert a rotational force on the first arm to maintain the battery compartment-enclosing portion of the first arm away from the battery compartment when the IP seal has been disengaged.

12. The battery latch assembly of claim 8, further comprising a biasing member that is configured to bias the second fastening element into a position where the second fastening element releasably engages the second cooperating member to maintain the second latch point.

13. The battery latch assembly of claim 12, wherein the biasing member is additionally configured to provide a resistive force for the release actuator.

14. The battery latch assembly of claim 13, wherein:
activation of the release actuator causes the biasing member to deform; and
deformation of the biasing member causes the second fastening element to disengage from the second cooperating member within the first arm.

15. The battery latch assembly of claim 1, wherein:
the first cooperating member comprises a pin that is mounted to the device; and
the first fastening element comprises a hook that releasably engages the pin.

16. The battery latch assembly of claim 1, wherein:
the second cooperating member comprises a ledge in a recess formed within the first arm; and
the second fastening element comprises a tab that extends from the second arm and releasably engages the ledge.

17. The battery latch assembly of claim 1, further comprising an upward force-exerting member that is located underneath the battery within the battery compartment, the upward force-exerting member being positioned to exert an upward force against the battery.

18. A barcode-reading device, comprising:
a housing defining a battery compartment designed to hold a removable battery; and
a battery latch assembly that is configured to secure the battery compartment, the battery latch assembly comprising:
a first arm that is coupled to the housing, the first arm comprising a battery compartment-enclosing portion;
a second arm that is coupled to the first arm so as to facilitate movement of the second arm relative to the first arm;
a first fastening element that is configured to releasably engage with a first cooperating member to form a first latch point that secures the first arm in a position where the battery compartment-enclosing portion is aligned with and covers the battery compartment; and
a second fastening element that is configured to releasably engage with a second cooperating member to establish a second latch point that secures the second arm to the first arm, the second latch point working in conjunction with the first latch point to provide dual locking for the battery latch assembly.

19. The barcode-reading device of claim 18, wherein:
the battery latch assembly further comprises a sealing member that is configured to encompass the battery compartment-enclosing portion of the first arm; and
engagement of the first cooperating member by the first fastening element exerts a compressive force on the sealing member to establish an ingress protection (IP) seal over the battery compartment.

20. The barcode-reading device of claim 18, wherein:
the first arm is pivotally coupled to the barcode-reading device so as to facilitate first rotational movement of the first arm relative to the battery compartment, the first rotational movement occurring in a first direction; and
the second arm is pivotally coupled to the first arm so as to facilitate second rotational movement of the second arm relative to the first arm, the second rotational movement occurring in a second direction that is different from the first direction.

\* \* \* \* \*